united States Patent Office 3,125,411
Patented Mar. 17, 1964

3,125,411
PROCESS FOR PRODUCTION OF
NON-BURNING FERTILIZER
Grover L. Bridger and Norval K. Alfrey, Baltimore, Md.,
assignors to W. R. Grace & Co., New York, N.Y., a
corporation of Connecticut
No Drawing. Filed Feb. 10, 1961, Ser. No. 89,097
1 Claim. (Cl. 23—105)

This invention relates to fertilizer materials suitable for application to plant life. Specifically, it relates to a means of fertilizing growing plants with no burning, or plasmolysis.

It is a well-known fact that the germination of seeds may be prevented or established crops may be injured by the presence of too much soluble salt in the soil. This phenomenon may occur even though all of the elements which the plant requires for its proper nutrition are present in normal proportions to one another and substances that exhibit specific plant toxicity effects are not present in excess. This type of injury must therefore be connected with the high concentration of the soil solution, and it has been commonly thought that the elevated osmotic pressure of such solutions is responsible for such injury. This has been borne out by experimental studies which have clearly demonstrated that growth reduction of several crops was linear with the increasing osmotic pressure of the substrate over the range from 0.4 to 4.4 atmospheres and that a number of crop species died when the osmotic pressure of the culture reached 4.5 atmospheres.

Except under unusual conditions the osmotic pressure of the soil solutions should never become high enough to injure the crop when the fertilizer is uniformly broadcast. When the fertilizer is localized in a small zone, however, as in various special placements, the soluble portion of the fertilizer dissolves only in the soil moisture immediately surrounding that zone. This results in local areas of salt solution many times as concentrated as that met within broadcast application and not infrequently injury to plants follows if due precautions are not taken. Simply reducing the amount of fertilizer to avoid injury might mean going below the optimum amount of plant food.

The osmotic pressure produced in the soil solution by a given salt application is the result of many factors. Among these may be mentioned the quantity of salt added, the amount of moisture in the soil, base exchange, and other reactions into which the added salt may enter, temperature, and the amount of biological action in the soil.

Some fertilizers react with the constituents of the soil to a much greater extent than others. A mixture containing a high proportion of soluble salts that undergo fixation in the soil may therefore increase the concentration of the soil solution less than one containing a lower percentage of soluble salts that are not fixed in the soil. The soluble salt content of different fertilizer mixtures cannot therefore be employed as an accurate measure of their influence on the soil solution.

As well, the composition of the fertilizer, especially the relative proportion of divalent and monovalent elements is of particular importance insofar as the dissociation of the fertilizer salts into ions is concerned. It must be recalled that osmotic pressure, as a colligative property of solutions, is dependent primarily on the number rather than the nature of the particles formed. However, the larger and more complex the particles, the less likely they are to affect the properties of the solution, since pure colligative properties are exhibited to the greatest degree in ideal solutions. Hence, it is not difficult to see why certain larger units, such as phosphates, have the least effect on this situation.

The actual damage done is an effect known as "burning" because firing or scorching of the leaves of the plants is often a sympton of such injury. In general, water enters the plant too slowly to compensate for that lost by transpiration or else it actually passes from the roots by osmosis. The reason for such a transaction is easily understood when the principle of osmosis is recalled. Osmotic pressure represents the tendency of the solvent, in this case water, to distill through a semi-permeable membrane, in this case the cell wall, from a region containing a solution of high vapor pressure, this case the interior of the cells of plants, to one of lower vapor pressure, in this case, the exterior of the cells of the plants, i.e., the surface of the plant. This situation of unequal vapor pressures is due to the difference in the concentrations of the "solutions" on the two sides of the cell wall. On the one side, there is the fertilizer dissolved in the moisture available in the soil. This makes a fairly concentrated solution. On the other side, i.e., on the inside of the cell, the solution comprises protoplasm, a viscid, grayish, translucent, colloidal substance of granular structure and complex composition. In it are dissolved the minerals, enzymes, and other constituents necessary for the life of the cell.

When the vapor pressure outside the cell is sufficiently low, the water from the protoplasm leaves the cell, thereby resulting in protoplasmic shrinking or plasmolysis. The ultimate result is the total destruction of the cell. It is such destruction that is generally termed plant burning, and is, as has been shown, a direct consequence of heedless fertilization.

On the other hand, fertilization is necessary; such substances as nitrogen and phosphoric acid must be supplied to all plants if they are to flourish. As well, many other elements are needed for healthy crops.

Some plants, such as corn and small grains, are able to utilize nitrogen in the organic form, such as acetamide and a number of amino acids. However, most of the nitrogen found in plant tissues in proteins or in other forms was originally absorbed as nitrate or ammonium ions. Consequently, a good fertilizer must ultimately supply nitrogen in this form if it is to be successful. But placing a liberal supply of ions in the soil generally raises the overall soil concentration to the point where burning of the plants takes place rapidly. Nitrogen supplied in the organic form is successful in meeting the demands of the plant and in keeping the ion concentration level of the soil below the danger point. However, this is true only under optimum conditions for the nitrification of the fertilizer, i.e., the conversion of the nitrogen to the form of soluble nitrates. (This is accomplished chiefly through bacterial action.) But more and more, organic fertilizers are being replaced by inorganic fertilizers which can be manufactured on a large scale. And the use of inorganic fertilizer invariably introduces ions into the soil.

One of the obvious solutions to this problem is the control of nitrification rate of the fertilizer used. In this way, the rate of nutrient availability can be timed with plant needs thereby insuring greater utilization of nutrients by the plant and less loss by fixation in the soil or by leaching. However, the rate of nitrification of soluble fertilizers cannot be altered since dissolution takes place quickly even from dense granules. Nitrification of urea-formaldehyde is likewise almost independent of granulation because it is water-soluble to a substantial degree.

It has been found that metal ammonium phosphates can be granulated to decrease the rate of nitrification. As the granule size increases, rate of nitrification decreases. To maintain this controlled rate of nitrification, it is desirable to have a fertilizer of uniform predetermined particle size which will not break up on handling and which does not disintegrate on prolonged contact with the soil acids.

It is an object of this invention to provide a means for adequately supplying plant nutrients without danger of burning. It is a further and more specific object of this invention to provide a means for preparing fertilizer which can be applied to plants with no maximum allowable dosage and which after application, is available to the plants only at a controlled rate. It is yet another object to provide a metal ammonium phosphate fertilizer which is resistant to impact during handling and which does not readily disintegrate in the soil.

Any suitable equipment, such as a rotary pan, rotary drum, or pug mill can be used for granulating the magnesium ammonium phosphate raw material. This is supplied to the granulator either as a dry powder or as a filter or centrifuge cake or as an aqueous slurry. The newly formed wet granules are then retained below 160° F. No attempt was made to establish the minimum effective temperature. It was noted that decreasing temperatures increased the rate of hardening and temperatures as low at 40° F. were used in the observations. The longer the retention time allowed, the greater the increase in crushing strength. It was observed that during this aging period, hexahydrate crystallization had begun to occur, and this is believed to be an important factor in the increased hardness. We have found that retention for a period of 15 to 30 minutes gives successful results in that the granules have the desired crushing strength. Thus, the hardness of the granules can be controlled by careful variation in the aging time.

Drying is accomplished in any suitable equipment (rotary drum or kiln, fired directly or indirectly). Although the drying temperature is not critical, care must be taken not to exceed the temperature at which the granules decompose—about 250° F. for magnesium ammonium phosphate. We have found that drying at 210° F. of magnesium ammonium phosphate and 150° F. for iron ammonium phosphate gives quite successful results. After being dried, the material is classified according to size, and the oversize particles are crushed and recycled with the underside particles to the granulator. The product is conveyed to storage, or any or all of it may be crushed and recycled to the granulator when desirable to control wetness and size of granules produced from raw material slurry.

As is well known (e.g., see Duval and Duval, Anal. Chim. Acta., 2, 45–52 (1948)), magnesium ammonium phosphate hexahydrate is stable below about 40° C. (104° F.), but loses water of hydration as the temperature increases until (Kaselitz U.S. Patent 1,881,195), at a temperature of 100° C. (212° F.), five molecules of water of hydration are lost leaving the monohydrate.

The aging process described above corrects the tendency of water-insoluble fertilizer granules which form hydrates to soften and fall apart easily soon after being placed in the soil. More surface is exposed when softening and disintegration take place and thus leaching, solubilizing, and other mechanical and chemical actions occur more readily. When the granules formed in the manner described above are placed in the coil, they actually become harder and more resistant to mechanical shock. Inasmuch as further hydrate formation is observed to have taken place, the theory that this is connected with the hardening of the granules would seem to be affirmed.

The following experiments are given for the purpose of demonstrating typical weight ratios in the production of the final fertilizer.

*Example I*

4000 pounds of slurry comprising 70% water and 30% magnesium ammonium phosphate were introduced into a pan granulator along with 1200 pounds of solid crushed magnesium ammonium phosphate. Following granulation, the particles were retained in drums for a period of 15 to 30 minutes. It was then dried in a horizontal rotary kiln and classified according to size. Of the 4000 pounds, 600 pounds comprising 99% magnesium ammonium phosphate and 1% moisture, the undersize and crushed oversize particles, were recycled with one ton of raw material slurry for granulation. The yield for each ton of slurry fed in was about 600 pounds (1% moisture) of less than 6 and more than 16 mesh product.

The following table shows typical increases in crushing strength of dried product granules resulting from increased retention previous to drying. Each granule's strength was determined using a laboratory scale balance and determining the total weight required upon the granule to cause it to collapse. All granules were dried to approximately 1% moisture previous to the crushing tests. The granule average diameter was 0.14 inch. The averages given represent a total of thirty-four tests for each given set of conditions:

| Retention Before Drying (minutes) | Average Granule Crushing Strength (grams) |
| --- | --- |
| Few seconds | 237 |
| 10 | 514 |
| 30 | 782 |
| 60 | 900 |

*Example II*

[Granule hardness versus time in soil at 70° F.]

| Time in the Soil | Granule Crushing Strength When Soil Was "Field Capacity" wetness,[1] grams |
| --- | --- |
| 10 days | 1498.8 |
| 24 days | 1693.4 |
| 38 days | 1810.3 |
| Crushing Strength of the Dry Granules used in the Tests | 852.4 |

[1] Chester silt loam soil was used. Field capacity wetness is that moisture which is left after saturated soil has been permitted to drain. The crushing strength is that weight against the individual granule which causes collapse. Ten tests were run for each time period. All granule tested were chosen on a size basis, i.e., 0.14 inc h diameter. In each case hardness was checked immediately after removal from the soil.

We claim:

A process for the production of a fertilizer having a controlled rate of nitrification and a resistance to impact during handling comprising granulating a mixture of a 25–40% magnesium ammonium phosphate monohydrate aqueous slurry and solid crushed hydrated magnesium ammonium phosphate in the weight ratio of 1000 lbs. of said solid in said slurry to 300 lbs. of said crushed solid, aging the thus formed granules at a temperature in the range of 40–160° F. for 15–30 minutes, thereby to give hydrated magnesium ammonium phosphate, the degree of hydration being dependent on the aging temperature, with the product being substantially the hexahydrate below 104° F., and being less hydrated when using aging temperatures above 104° F., drying the aged granules at temperatures below about 250° F., classifying the dried granules according to size, crushing all particles retained on a 6 mesh screen, recycling said crushed particles and the particles passing a 16 mesh screen to the granulation step with additional slurry, and recovering the particles passing a 6 mesh screen and retained on a 16 mesh screen.

References Cited in the file of this patent

UNITED STATES PATENTS 1,881,195    Kaselitz _____ Oct. 4, 1932
1,913,539    Friedrich _____ June 13, 1933
1,921,114    Brackelsberg _____ Aug. 8, 1933

OTHER REFERENCES

J. W. Mellor, "Comprehensive Treatise on Inorganic and Theoretical Chemistry," Longmans, Green and Co., London, vol. 4, pp. 384–386.